Dec. 5, 1944.  F. A. HUBBARD  2,364,444
TIMING MECHANISM
Filed Nov. 26, 1941   2 Sheets-Sheet 1
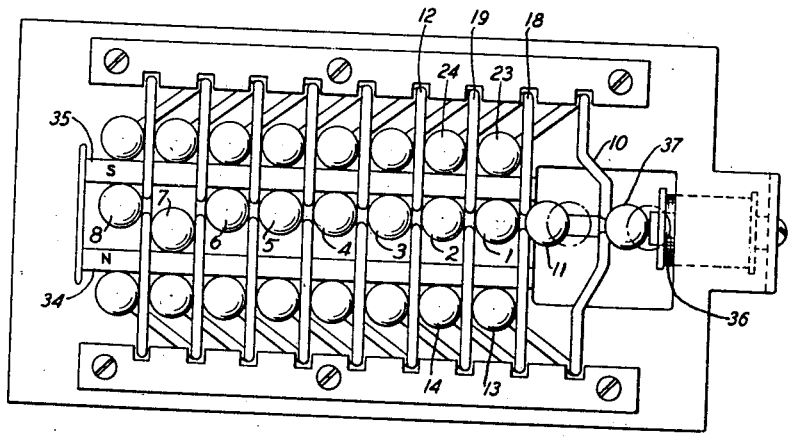
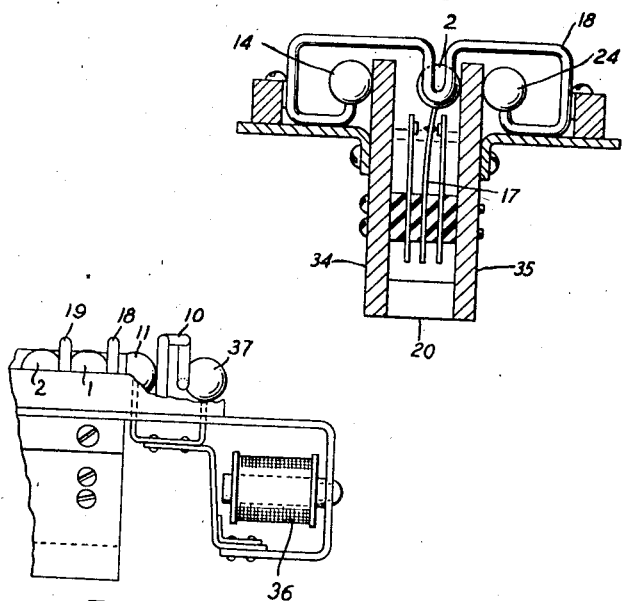
INVENTOR
FRANCIS A. HUBBARD
BY
P. C. Smith
ATTORNEY Dec. 5, 1944.  F. A. HUBBARD  2,364,444
TIMING MECHANISM
Filed Nov. 26, 1941  2 Sheets-Sheet 2

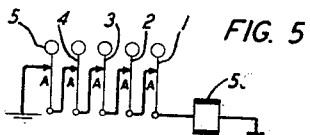

FIG. 5

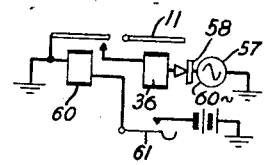

FIG. 6

| NO. OF IMPULSES | TIME, SECS. | | POSITIONS OF BALLS | | | | | | | | | |
|---|---|---|---|---|---|---|---|---|---|---|---|---|
| | 64v | 4v | 10 | 9 | 8 | 7 | 6 | 5 | 4 | 3 | 2 | 1 |
| 0 | | | | | | | | A | A | A | A | B |
| 1 | | | | | | | | A | A | A | B | A |
| 2 | | | | | | | | A | A | B | B | B |
| 3 | | | | | | | | A | A | B | A | A |
| 4 | .0625 | 1 | | | | | | A | B | B | A | B |
| 5 | | | | | | | | A | B | B | B | A |
| 6 | | | | | | | | A | B | A | B | B |
| 7 | | | | | | | | A | B | A | A | A |
| 8 | .125 | 2 | | | | | | B | B | A | A | B |
| 9 | | | | | | | | B | B | A | B | A |
| 10 | | | | | | | | B | B | A | B | A |
| 11 | | | | | | | | B | B | B | B | B |
| 12 | | | | | | | | B | B | B | A | A |
| 13 | | | | | | | | B | A | B | A | B |
| 14 | | | | | | | | B | A | B | B | A |
| 15 | | | | | | | | B | A | A | B | B |
| 16 | .25 | 4 | | | | | A | B | A | A | A | A |
| 17 | | | | | | | B | B | A | A | A | B |
| 18 | | | | | | | B | B | A | A | B | A |
| 19 | | | | | | | B | B | A | B | B | B |
| 20 | | | | | | | B | B | A | B | A | A |
| 21 | | | | | | | B | B | B | B | A | B |
| 22 | | | | | | | B | B | B | B | A | A |
| 23 | | | | | | | B | B | B | A | B | B |
| 24 | | | | | | | B | B | B | A | A | A |
| 25 | | | | | | | B | A | B | A | A | B |
| 26 | | | | | | | B | A | B | B | B | B |
| 27 | | | | | | | B | A | B | B | A | A |
| 28 | | | | | | | B | A | A | B | A | B |
| 29 | | | | | | | B | A | A | B | B | A |
| 30 | | | | | | | B | A | A | B | B | A |
| 31 | | | | | | A | B | A | A | A | A | A |
| 32 | .50 | 8 | | | | | B | B | A | A | A | A | B |
| 48 | .75 | 12 | | | | | B | A | B | A | A | A | B |
| 64 | 1.0 | 16 | | | | B | B | A | A | A | A | A |
| 80 | 1.25 | 20 | | | | B | B | B | B | A | A | A |
| 96 | 1.5 | 24 | | | | B | A | B | A | A | A | A |
| 112 | 1.75 | 28 | | | | B | A | B | A | A | A | B |
| 128 | 2.0 | 32 | | | B | B | A | A | A | A | A | B |
| 256 | 4.0 | 64 | B | B | A | A | A | A | A | A | A | B |

FIG. 4

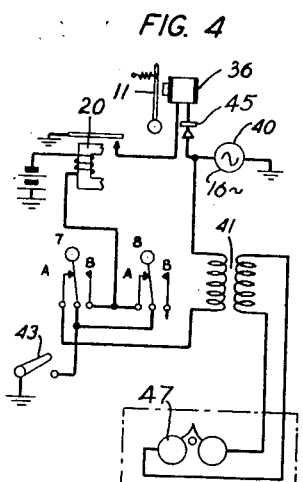

INVENTOR
FRANCIS A. HUBBARD
BY
P. C. Smith
ATTORNEY

Patented Dec. 5, 1944

2,364,444

UNITED STATES PATENT OFFICE 2,364,444

TIMING MECHANISM

Francis A. Hubbard, Maplewood, N. J., assignor to Bell Telephone Laboratories, Incorporated, New York, N. Y., a corporation of New York Application November 26, 1941, Serial No. 420,495

7 Claims. (Cl. 161—1)

This invention relates to telephone systems and has for its object to provide novel means for controlling timed operations therein.

In the copending application of G. R. Stibitz, Serial No. 420,537, filed November 26, 1941, which issued January 12, 1943, as Patent 2,307,868, is described a mechanism by which a series of binary counting devices control each other by means of impacts transmitted from one to the next.

In accordance with the present invention, such a device may be employed for ringing control.

More specifically, such a device permits the immediate application of intermittent ringing, without waiting for the beginning of a cycle as is necessary when interrupters are used.

The invention will be more clearly understood from a consideration of the following description in connection with the drawings, in which Fig. 1 is a diagrammatic showing of the binary impact counter.

Fig. 2 shows one unit of the device of Fig. 1;

Fig. 3 shows a partial side view of the device of Fig. 1;

Fig. 4 shows a circuit arrangement by which the device of Fig. 1 may control ringing;

Fig. 5 shows an arrangement suitable for timing; and

Fig. 6 is a table giving the successive positions of a series of elements such as shown in Figs. 1 and 2.

The binary counting device above-mentioned and diagrammatically shown in Figs. 1 and 2 consists of a clapper 11, a magnet 20 and a series of ranks of three small steel balls, 1, 13, 23. The clapper 11 is operated by a coil 36 which may be energized by either alternating current or interrupted direct current. The magnet 20 has elongated pole-pieces 34 and 35 and is preferably an electromagnet but may be a permanent magnet. As shown in Fig. 2, the middle ball 2 of each rank is carried on a contact bearing spring 17 and is located between the pole-pieces 34 and 35 of the magnet 20. The separation between pole-pieces 34 and 35 is somewhat greater than the diameter of the ball 2, so that each middle ball has two stable positions, one against the north pole-piece 34 and the other against the south pole-piece 35 as illustrated by ball 2 in Fig. 2. The other two balls 14 and 24 of each rank are located outside the pole-pieces 34 and 35 and are carried on the ends of a piece of spring tempered wire or sheet metal bent into a peculiar shape as shown. These wires are so formed that wire 18, for example, has a loop lying back of ball 1, while the outer balls 14 and 24 carried thereby lie in the rank of ball 2. The balls 13 and 23 belonging to the rank of ball 1 are mounted on an auxiliary wire 10 which receives an impact from ball 37 at each energization of magnet 36. A more complete description of this device may be found in the above-identified Stibitz application.

For the purposes of the table of Fig. 6, the upper position of the balls is called position A while the lower position is called position B. The mounting springs are so adjusted that ball 1 is normally in position B while balls 2, 3 etc. are normally in position A, and the balls take up these positions when magnet 20 is not energized. With magnet 20 energized the balls will remain in either position. When magnet 20 is a permanent magnet, the balls 1, 2, 3, etc., do not return to their normal positions except at the end of a definite number of cycles.

The clapper 11 is in alignment with position A of the balls and when drawn back and released will deliver an impact on spring 18. With ball 1 in position B spring 18 is moved to the left by this impact causing balls 14 and 24 to move away from pole-pieces 34 and 35 and then spring back converting the impact of clapper 11 into a transverse impact on ball 2 which moves into position B. The clapper 37 also acts on the auxiliary spring 10 to cause balls 13 and 23 to deliver an impact to ball 1 and restore it to position A.

The next blow by clapper 11 is transmitted through ball 1 to spring 19 which transmits a transverse impact to ball 3, moving it to position B. The auxiliary mechanism also moves ball 1 to position B. The third pulse acts on spring 18 and restores ball 2 to position A, ball 1 also returning to position A. At the fourth pulse, the blow of clapper 11 is transmitted through balls 1 and 2 to spring 12 which delivers a blow to ball 4, moving it to position B.

The effect of each impulse, therefore, is to reverse the position of the ball next beyond the first one that is encountered in position B, the auxiliary mechanism reversing the position of ball 1 after every impulse.

The results of a series of impulses are shown in the tabulation of Fig. 6. Before the first impulse, the first ball only is in position B. Hence the second ball is transferred to position B, while the auxiliary mechanism shifts the first ball to position A. When the second impulse arrives, it finds the second ball in position B, and therefore shifts the third ball to position B; the second ball is left unchanged, while the first ball returns to position B. For the third pulse, the first ball is in the controlling position, position B, so that the second ball is returned to position A. The succeeding pulses act, as previously stated, to move the ball following the first one found in position B, producing the pattern shown in detail for the first thirty-two impulses in Fig. 6. It will be noted that the fifth ball is unaffected until the eighth pulse, the sixth ball until the sixteenth pulse and so on in ascending powers of 2. It also appears that the lower numbered balls return to their original positions as each additional ball is moved.

This characteristic permits the use of the device as a simple timer. If the magnet 36 is actuated by alternating current, each ball will make its first shift in position after a definite number of cycles, and contacts controlled by the balls can be used to mark off time intervals from the closing of a start contact. Some of these time intervals based on rectified supply frequencies of sixty-four cycles and four cycles have been indicated in the table of Fig. 3. For a frequency of sixty cycles, a device having 20 ranks of balls could measure about an hour, while a device having 33 ranks of balls could measure over a year.

The device of Fig. 1 may be adapted to measure any desired time intervals by selecting a number of ranks of balls and an appropriate frequency, the contact of a particular rank performing any required function. If it is desired to repeat a time interval, the starting circuit may be carried through the contact of the desired rank to both the hold and pulsing magnets. With such an arrangement the movement of the selected ball would simultaneously terminate the pulsing and restore the balls to their normal position where the starting circuit would be reclosed to repeat the time interval.

In Fig. 4 is shown an arrangement whereby a device having eight ranks of balls may be used to control the application of ringing current. A source of 40 of sixteen cycle ringing current is employed which is fed through transformer 41 to the substation ringer 47 in any desirable manner. When ringing is to start, a starting contact represented by key 43 is closed, completing a circuit from ground over key 43, contact A of the seventh rank ball 7, primary winding of transformer 41 to source 40. At the same time a circuit is closed from ground over key 43, contact A of ball 8 of the eighth rank, through the winding of holding magnet 20 to battery. Magnet 20 closes an auxiliary contact which completes a circuit for pulsing magnet 36 in series with rectifier 45 and source 40. Magnet 36 responds to the current from source 40 to cause clapper 11 to make sixteen impacts per second. By inspection of the table of Fig. 6 it will appear that it requires 32 pulses to move the ball of the seventh rank. Therefore ringing current will be applied to conductor 42 and ringer 47 for two seconds. The movement of seventh rank ball 7 opens the primary circuit of transformer 41, cutting off the ringing current but magnet 20 is held operated over contact A of ball 8. Thirty-two more pulses will bring about the operation of the eighth rank of ball 8 to open its contact A. However, ball 7 at its contact B closed an alternate circuit for magnet 20 and remains in position B for thirty-two more pulses, so that ringing current is off for 64 pulses or four seconds. When ball 7 is returned to position A the circuit of magnet 20 is opened, the balls are all restored to normal and the above-described cycle is ready to repeat.

This particular arrangement has the advantage that the intermittent ringing starts immediately on the closure of a ringing starting contact and continues until that contact is opened.

From an inspection of Fig. 6 it will appear that at pulse 10, the first five balls are all in position B, while at pulse 31 they are all in position A and at pulse 32 they are in their original position as they are again at pulse 64, 96, 128, etc. In other words, with a device having only five balls any one arrangement will recur every thirty-two pulses, while with a device having six balls, any one arrangement will recur every sixty-four pulses and so on.

In Fig. 5 is shown a timing device depending on the above. When the timing period is to be started, a contact represented by key 61 is closed, operating relay 60, which in turn closes a circuit for magnet 36 in series with rectifier 58 and source 57. At each cycle, clapper 11 delivers an impact, whereby after thirty-one cycles, balls 1 to 5 of the five ranks are all in position A to close a series circuit for relay 56 which may control any desired type of indicating device. With a sixty cycle source 57 the operations of relay 56 will take place at approximately half second intervals. Another method of measuring a time interval with such a five rank device (not shown) would place the holding magnet under the control of the A contacts of all of the balls in parallel so that after ten pulses, when all of the balls would be in position B, the holding magnet circuit would be opened to restore the balls to their normal position and start a new cycle.

What is claimed is:

1. Timing means comprising a source of pulsating current, a series of devices having two positions of rest, means under the control of said pulsating current to move the first of said devices between said positions of rest, means to simultaneously associate said moving means and said source and to start a timed operation, means effective with each of said devices in one of said positions of rest to move the next device in said series into said one position and means effective when a predetermined device has been moved into said one position to terminate said timed operation.

2. Timing means comprising a source of pulsating current, a series of devices having two positions of rest, means under the control of said pulsating current to move the first of said devices between said positions of rest, means controlled through said first device to successively move said other devices from one of said positions of rest to the other, means to simultaneously start a timed operation and place said first device under the control of said source and means controlled by the movement of a predetermined device into said other position of rest to terminate said timed operation.

3. Timing means comprising a source of pulsating current, a series of devices having two positions of rest, means under the control of said pulsating current to move the first of said devices between said positions of rest, means controlled through said first device and intermediate ones of said devices to initially move each of said other devices from one position of rest to the other in response to predetermined numbers of pulsations and to thereafter move said devices between said positions of rest, means for simultaneously starting an operation and placing said first device under the control of said source, means controlled by the first movement of a predetermined one of said devices for terminating said operation and means controlled by the first movement of a subsequent one of said devices for simultaneously restoring all of said devices to their initial positions of rest for restarting said operation.

4. Timing means comprising a source of pulsating current, a series of devices having two positions of rest, means under the control of said pulsating current to move the first of said devices between said positions of rest, means controlled through said first device to move each of said other devices from one position of rest to the other in response to predetermined numbers of pulsations and to thereafter move said devices between said positions of rest, said devices all recurrently occupying the same position of rest, and a circuit closed under the joint control of all of said devices in said same position of rest to operate a responsive device.

5. Timing means comprising a source of pulsating current, a series of devices having two positions of rest, means under the control of said pulsating current to move the first of said devices between said positions of rest, means controlled through said first device to move each of said other devices from one position of rest to the other in response to predetermined numbers of pulsations and to thereafter move said devices between said positions of rest, said devices all recurrently occupying the same position of rest and a circuit closed under the joint control of all of said devices in said same position of rest to operate a responsive device, the frequency of operation of said responsive device depending on the frequency of said pulsating source and on the number of said devices.

6. Timing means comprising a source of pulsating current, a series of devices having two positions of rest, means under the control of said pulsating current to move the first of said devices between said positions of rest, means controlled through said first device and intermediate ones of said devices to successively move said other devices from one of said positions of rest to the other, means to simultaneously start a timing operation and place said first device under the control of said source and means controlled by the movement of the last of said devices into said other position of rest to terminate said timing operation, the duration of said timing operation depending on the number of said intermediate devices.

7. Timing means comprising a source of pulsating current, a series of devices having two positions of rest, means under the control of said pulsating current to move the first of said devices between said positions of rest, means controlled through said first device and intermediate ones of said devices to successively move said other devices from one of said positions of rest to the other, means to simultaneously start a timing operation and place said first device under the control of said source and means controlled by the movement of the last of said devices into said other position of rest to terminate said timing operation, the duration of said timing operation depending on the number of said intermediate devices and upon the frequency of said pulsating current.

FRANCIS A. HUBBARD.